United States Patent
Benjamin et al.

(10) Patent No.: US 9,384,231 B2
(45) Date of Patent: Jul. 5, 2016

(54) DATA LINEAGE MANAGEMENT OPERATION PROCEDURES

(71) Applicant: Bank of America Corporation, Charlotte, NC (US)

(72) Inventors: Amy R. Benjamin, Charlotte, NC (US); Chris E. McClennen, Charlotte, NC (US); Monica G. Santo Domingo, New York, NY (US); Jeffrey M. Dufresne, Charlotte, NC (US); Cynthia R. Sullivan, Suwanee, GA (US)

(73) Assignee: Bank of America Corporation, Charlotte, NC (US)

( * ) Notice: Subject to any disclaimer, the term of this patent is extended or adjusted under 35 U.S.C. 154(b) by 37 days.

(21) Appl. No.: 13/923,650

(22) Filed: Jun. 21, 2013

(65) Prior Publication Data
US 2014/0379665 A1    Dec. 25, 2014

(51) Int. Cl.
*G06F 7/00*     (2006.01)
*G06F 17/30*    (2006.01)
*G06Q 40/00*    (2012.01)

(52) U.S. Cl.
CPC .... *G06F 17/30371* (2013.01); *G06F 17/30309* (2013.01); *G06Q 40/00* (2013.01)

(58) Field of Classification Search
CPC ................... G06F 17/30309; G06F 17/30371; G06Q 40/00
USPC ........................................................ 707/694
See application file for complete search history.

(56) References Cited

U.S. PATENT DOCUMENTS

| | | | |
|---|---|---|---|
| 5,504,890 A | * | 4/1996 | Sanford |
| 5,786,998 A | * | 7/1998 | Neeson et al. ............... 701/29.6 |
| 7,117,219 B1 | * | 10/2006 | Powers et al. ................. 707/603 |
| 7,849,050 B2 | | 12/2010 | Mangipudi |
| 7,899,832 B2 | | 3/2011 | Abhyankar et al. |
| 7,930,432 B2 | | 4/2011 | Blaszczak |
| 7,937,415 B2 | | 5/2011 | Ducaule et al. |

(Continued)

OTHER PUBLICATIONS

Puri, Colin, "Chicken Wings & Data Lineage, Who Knew . . . " (http://www.accenture.com/us-en/blogs/technology-labs-blog/archive/2012/08/20/chicken-wings-amp-data-lineage-who-knew%E2%80%A6.aspx), Accenture Ltd. (registrant), Dallas, Texas, Aug. 20, 2012.

(Continued)

*Primary Examiner* — Charles Lu
(74) *Attorney, Agent, or Firm* — Weiss & Arons LLP; Michael A. Springs, Esq.

(57) ABSTRACT

Apparatus and methods for data lineage management operation procedures are provided. The apparatus may include a relational database. The relational database may store a plurality of Key Business Elements ("KBEs"). The apparatus may retrieve a selected KBE. The selected KBE may include one or more KBE parameters. The parameters may be associated with the selected KBE. The KBE may be used in a business process. The apparatus may include a processor. The processor may identify a KBE system of origination. The system of origination may create the KBE. The system of origination may modify the KBE. The processor may identify a KBE system of record. The system of record may determine an authoritative source. The authoritative source may be the authoritative source of the KBE. The processor may develop a data lineage. The data lineage may be the lineage of the KBE from the system of origination to the system of record.

22 Claims, 8 Drawing Sheets

(56) References Cited

U.S. PATENT DOCUMENTS

| | | |
|---|---|---|
| 7,953,891 B2 | 5/2011 | Blaszczak et al. |
| 2006/0193283 A1* | 8/2006 | Harris et al. ............... 370/328 |
| 2009/0240609 A1* | 9/2009 | Cho et al. ..................... 705/30 |
| 2010/0114628 A1* | 5/2010 | Adler et al. ..................... 705/7 |
| 2011/0066602 A1* | 3/2011 | Studer et al. ............... 707/690 |
| 2011/0320460 A1 | 12/2011 | Fankhauser et al. |
| 2012/0179675 A1 | 7/2012 | Friedman et al. |
| 2012/0179990 A1 | 7/2012 | Curbera et al. |
| 2012/0310875 A1 | 12/2012 | Prahlad et al. |

OTHER PUBLICATIONS

Marchant, Hayden, "Exploring data lineage: Get a complete picture of your data flows" (http://www.ibm.com/developerworks/data/library/techarticle/dm-1001datalineageinfosphereworkbench/), International Business Machines Corporation (IBM) (registrant), Armonk, New York, Jan. 7, 2010.

* cited by examiner

FIG. 8

EDIT KEY BUSINESS ELEMENT (KBE) — 802

| Field | Value |
|---|---|
| BUSINESS ELEMENT IDENTIFIER | KBE00015571 |
| BUSINESS ELEMENT NAME — 804 | CLIENT ID NUMBER |
| STATUS — 806 | ACTIVE |
| SECURITY CLASSIFICATION — 808 | CONFIDENTIAL |
| BUSINESS DEFINITION — 810 | UNIQUE OBLIGOR IDENTIFIER: A NUMBER ASSIGNED TO THE CREDIT TAKER OR BORROWER AS MANAGED BY THE CLIENT DATABASE. 14Q STRESS TEST: THE UNIQUE INTERNAL IDENTIFIER FOR THE CUSTOMER RELATIONSHIP UNDER WHICH THE OBLIGOR'S EXPOSURE IS AGGREGATED IN THE REPORTING ENTITY'S CREDIT SYSTEMS. |
| BUSINESS RATIONALE — 812 | THIS IS A REQUIRED BASEL ATTRIBUTE, WHERE IF THE ATTRIBUTE IS INVALID, THE EXPOSURE IS PROVISIONED PUNITIVELY. 14Q STRESS TEST - FRY14Q CORPORATE LOAN STRESS TEST REQUIRED DATA ELEMENT. |
| DATA DOMAIN — 814 | TRADITIONAL CREDIT PRODUCTS |
| CREATION DATE — 816 | 05/06/2013 |
| COMMENTS — 818 | TEST KEY BUSINESS ELEMENT IDENTIFIER TO BE USED FOR AN EXTERNAL DEMO. |
| DATE LAST MODIFIED | |

GOLDEN DATA ELEMENT = W1 — 800

☑ PERSONALLY IDENTIFIABLE INDICATOR
☑ PRIORITIZED KBE

PRIVACY GENERIC DATA LABEL N/A
PRIVACY VALIDATION DATA 05/06/2013

LAST UPDATED BY — 822
— 820

| BUSINESS PROCESSES | DATA STEWARD EXECUTIVE | CONTROL STATUS | APPLICATION ROLES | SCORECARDS | OPERATIONAL OWNERSHIP | PRODUCT ASSOCIATION | MONITORING AGENCY | RELATED KBEs |
|---|---|---|---|---|---|---|---|---|
| DATA STEWARD EXECUTIVE — 824 | | | | | | | | |
| DATA STEWARD EXECUTIVE | LOB / GLOBAL CONTROL FUNCTION | DSE ACCEPTANCE | DSE ACCEPTED BY | DSE ACCEPTED DATE | | DSE NEXT REVIEW DATE | DELETE | |
| 🔍 | ENTERPRISE CAPITAL MANAGEMENT | ACCEPT | | 05/06/2013 | | 05/06/2014 | ☐ | |

[ADD DSE]

DATA LINEAGE MANAGEMENT OPERATION PROCEDURES

FIELD OF TECHNOLOGY

Aspects of the invention relate to data management procedures at financial institutions.

BACKGROUND

Recent developments in the financial industry have increased the compliance requirements for financial institutions. The financial institutions are faced with a wide array of compliance standards from a number of government entities, regulatory bodies, industry and trade groups and internal compliance requirements.

Maintaining compliance with the varying regulatory expectations requires meticulous data management. Often times, the data management is not uniformly applied, and varies by country, business operating unit and line of business. Maintaining proper data management often includes maintaining data lineage documentation.

As compliance standards have increased, so too has the amount of data maintained. Data maintenance includes a number of data elements for each transaction performed. Each data element must itself be traced and documented. Regulatory expectations require tracing the lineage of each data element through each point of operation within a scope of interest.

Financial institutions must also comply with regulatory requirements for maintaining data integrity and accuracy controls, as well as customer privacy. These controls impose strict requirements on data movement. Many of these controls have been implemented recently as a result of international agreements (Basel Agreements), United States regulatory developments (Dodd-Frank Act) and updates to existing regulatory infrastructure (FDIC).

The controls must be documented to ensure full compliance with the myriad of regulatory requirements. The increasing complexity of the data associated with maintaining compliance standards has imposed a greater burden on financial institutions in ensuring that data is properly maintained.

It would be desirable to provide solutions that allow for maintaining proper data lineage. It would be further desirable to capture all of the data relevant to every movement of every data element. The increased capture of data may allow for increased risk prevention, greater transparency in the banking process and greater privacy controls.

It would be further desirable, therefore, to generate a map clearly showing the details of the data flow, the location and types of controls. This information preferably allows a financial institution to increase data control. Additionally, this information preferably allows a financial institution to more readily adapt to changes in regulatory compliance standards. This information may also allow a financial institution to readily implement data changes that occur as part of the regular data life cycle.

Therefore, it would be desirable to provide data lineage that establishes the system responsible for data elements, as well as the governance of the data.

It would therefore be desirable to provide apparatus and methods for providing data lineage management operation procedures.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 8 shows an illustrative arrangement in accordance with principles of the invention.

DETAILED DESCRIPTION

Figure 1:
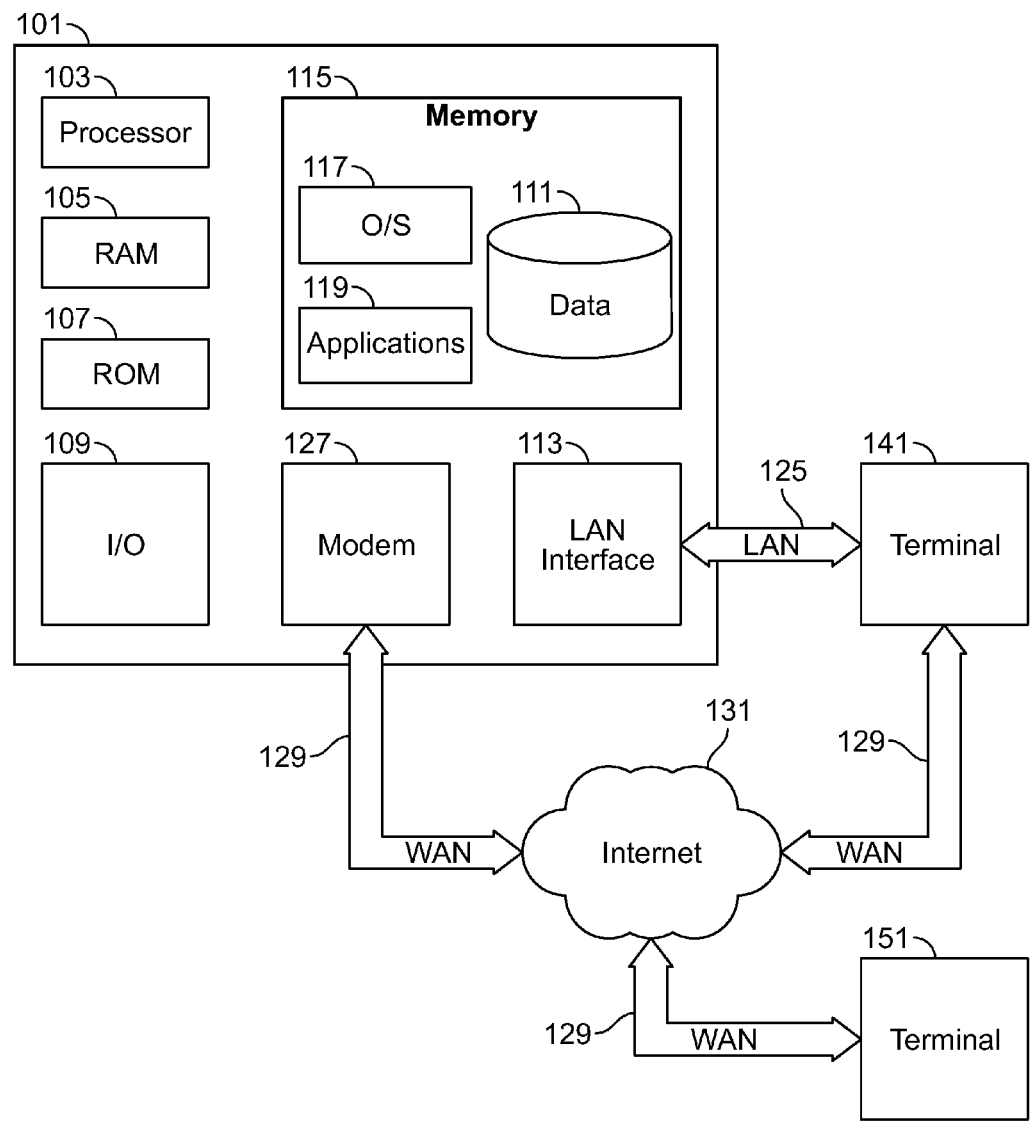
FIG. 1 shows an illustrative apparatus in accordance with principles of the invention.

Apparatus and methods for developing and maintaining data lineage are provided. The apparatus may include a relational database. The relational database may be configured to store data. The data may be a plurality of elements. The elements may be one or more Key Business Elements ("KBE"). The KBEs may include Enterprise Capital Management, Account Balance, Social Security Number, Client ID Number, Location, Risk Rating, Country Rating, Capital Location, Business Element, Business Element ID, Data Domain, Data Element ID, Security Classification and Tier I Capital Balance.

The apparatus may be configured to retrieve data. The data may be one or more KBEs. The one or more KBEs may be selected from a list of KBEs. The selected one or more KBEs may be retrieved in response to an action. The action may a query. The query may be transmitted to the relational database. The query may request the retrieval of the one or more KBEs.

Each selected KBE may include one or more parameters. Examples of KBE parameters may include: identification of party, a line of business ("LOB") responsible for creating and/or maintaining the KBE, data steward executive ("DSE"), customer number, KBE ID number, security classification of the KBE, date of creation of the KBE information and date of last KBE modification. The parameters may be associated with the selected KBE. The selected KBE may be used in a business process.

The apparatus may include a processor. The processor may perform a KBE retrieval. The retrieval may be a retrieval of the selected KBE. The processor may be configured to identify a KBE system. The system may be one or more systems. The system may be a KBE system. The KBE system may be a system of origination ("SOO"). The SOO may be configured to create the KBE. The SOO may be configured to modify the KBE.

The system may be a KBE system of record ("SOR"). The SOR may be configured to determine a source. The source may be an authoritative source. The authoritative source may be the authoritative source of the KBE.

The processor may be configured to develop data lineage. The data lineage may be the data lineage of the KBE. The data lineage may be the lineage of the KBE beginning at the SOO.

The data lineage may be the lineage of the KBE continuing to the SOR. The data lineage may be stored in a relational database.

The data lineage may include one or more details. The details may be element details. The element details may include information about data element creation. The information may be information about how the data element is created. The details may be location-based details. The location may be the location of the KBE creation. For example, the location may be a system, database, application, apparatus or any suitable software or hardware where a KBE is created. The location may be a geographical location. For example, the location may be a zip code where the KBE is created.

The data lineage may include one or more permissions. The permissions may be user permissions. The permissions may be administrator permissions. For example, the permissions may include which users and/or administrators have been granted access to create a KBE. The permissions may specify the level of access. For example, a user may be granted access to certain KBEs or categories of KBEs. In a further example, a user may be granted access to create a risk KBE, but not a social security number KBE. The user may be restricted from accessing certain KBEs or categories of KBEs. In another example, the permissions may include which users and/or administrators have been granted access to modify or otherwise alter a KBE.

The permissions may specify the quantity of modification allowed. For example, a permission may specify that no more than two modifications may be made to a KBE. In a further example, the permissions may require the authorization of a DSE to make a modification to the KBE. In yet a further example, the permissions may require the authorization of a DSE if more than two modifications are made to a KBE.

The lineage may generate a map. The map may be a physical map. The map may be displayed as part of a graphical user interface ("GUI"). The map may be any suitable map. For example, the map may be stored in software. The map may illustrate the data flow. The map may illustrate the presence or existence of one or more controls. The map may display the location of the one or more controls. The map may indicate the type of the one or more controls. The map may indicate which users have authorization for a specified segment of data flow. For example, the map may illustrate that a user has been granted authorization to modify a first segment of data flow, but not a second segment of data flow. In a further example, the map may indicate which users have access to modify KBEs stored in the SOR.

The apparatus may include a control. The control may be one of a plurality of controls. The apparatus may implement the control to assess control deficiencies. The control may be an automatic control. The control may be a manual control. The control may be a data control. The data control may be a data integrity control. The data control may be a data quality control. The control may be used to assess potential risks. The control may be used to identify potential risks.

The control may be selected from a group of controls. The group of controls may include one or more corrective controls. For example, the control may determine the presence of a piece of data. In a further example, in the absence of the piece of data, the control may correct an error by retrieving the missing data. The corrective control may determine if certain data is present. The corrective control may determine if certain data is absent. The corrective control may determine if certain data is deficient in any manner. For example, the corrective control may determine that a data field is missing. In another example, the corrective control may determine that a data field contains incorrect data. If certain data is deficient, the corrective control may rectify the deficiency. For example, the corrective control may fill in the missing data in a data field. In a further example, the corrective control may prompt a user to correct the data field deficiency.

The group of controls may further include one or more preventative controls. The preventative control may determine a presence of data. The preventative control may determine an absence of data. The preventative control may lock the system if certain data is absent. The preventative control may lock the system if certain data is present. The preventative control may lock the system if certain requirements are not satisfied. For example, the control may prompt the system to check the source of the data from the data lineage. In a further example, the system may determine if a data element is present in the data lineage. If the data element is not present, the control may lock the system. The lock may allow data traffic to continue.

The group of controls may further include one or more detective controls. The detective control may determine a presence of certain data. The detective control may determine an absence of certain data. The detective control may record the data determination. The data determination may be stored in a database. The determination may be reviewed. The review may be conducted in real-time. The review may be conducted at a later time. The review may be conducted by a DSE.

The one or more data integrity controls may be configured to authenticate data. The authentication may be an authentication of KBE data. For example, the data integrity controls may determine if one or more data elements in a KBE have been retrieved from a trusted source. In a further example, the data integrity controls may determine if the KBE has been retrieved from a secure server.

The data integrity controls may determine if the KBE is a valid KBE. For example, the control may determine if the KBE category is a valid KBE category. The data integrity controls may determine if one or more data elements from the KBE have been input by a valid party. For example, the control may determine that an employee of a financial institution input data elements into a KBE. In a further example, the control may determine that the employee had been granted permission to fill in the relevant data fields of the KBE. As a result of the determination, the control may allow data traffic to continue.

The control may identify one or more risks. The risks may be traced. The data lineage of the risks may be traced. The data lineage may be traced back to one or more systems. The system may be an SOO.

The control may be designated as a control type. The control type may be chosen from a dropdown list. For example, a control type may be a data movement control, a front end control, an operational control or a data quality reporting control. The control type may include an associated sub-type. The sub-type may be associated with the control type. The sub-type may be chosen within the control type.

The data movement control type may be associated with a plurality of sub-control types. Exemplary data movement control sub-control types may include record reconciliation, compare totals to previous cycles, compare file sizes, duplicate record check, correct time period, dependent jobs completed, monitoring and reporting, testing communication plan, checksum file, null/blank check, missing information feed detection and output records in correct order.

The record reconciliation sub-control type may reconcile data records. The control may make a first determination. The first determination may determine the number of records loaded in a target. The target may be a database. The control may make a second determination. The second determination may determine the number of records received from a source. The difference between the first determination and the second determination may be reconciled. The reconciliation may be a reconciliation between the records loaded in a target and the records from a source. The source may be a database.

The data movement sub-control type may be a control configured to compare one or more totals. The totals may be dollar totals. The dollar totals may be compared to previous cycles. The cycles may be previous data flow cycles. The dollar totals may be compared against a threshold dollar amount. For example, the expected threshold dollar total amount of a data flow cycle may be $200,000 per cycle. The dollar totals may be compared against a threshold range. The threshold range may be an expected reasonable range of dollar amounts within a data movement cycle. The threshold range may include a minimum threshold. The threshold range may include a maximum threshold range. For example, a threshold range may include a minimum threshold of $50,000 and a maximum threshold of $1,000,000.

The dollar total sub-control type may determine whether the dollar total during a data movement falls between the minimum threshold range and the maximum threshold range. For example, the control may be a preventative control. The preventative control may be a data movement control configured to compare dollar totals to previous cycles. In a further example, the preventative control may determine that the dollar total falls between the minimum threshold range and the maximum threshold range. If the dollar total falls within the threshold range, the preventative control may not lock the system. This may allow the data traffic to continuing \. In yet another example, the preventative control may determine that the total does not fall within the regular threshold range. The preventative control may be configured to prevent the data traffic from continuing forward.

It should be noted that all sub-control types may be operational with any suitable data control. For example, the control may be a corrective control. The corrective control may determine that the dollar total does not fall within the regular threshold range. As a result, the corrective control may be configured to lock the system. The lock may prevent the data traffic from continuing forward. The corrective control may attempt to correct data. The correction may include an initiation of an investigation. The investigation may determine that the dollar total does not fall within the threshold range. The investigation may be initiated in real-time. After the investigation, the control may determine that the dollar amount has been recorded in error. The corrective control may correct the error. The amount may not be an error. The control may lock the system.

The data movement sub-control type may be a control configured to compare one or more file sizes. The control may compare one or more physical file sizes. The control may compare the file size for the current data movement cycle against a threshold file size. The control may compare the file size for the current data movement cycle against the file size of the previous movement cycle. The threshold file size may be the average file size of data files from one or more previous data movement cycles. For example, the control may determine the amount of memory required to store a first file in a computer-readable medium. The first file may be the previous data movement cycle file. In a further example, the control may determine the amount of memory required to store a second file in a computer-readable medium. In yet another example, the control may determine the difference in the memory required to store the first file size and the second file size.

The threshold file size may be a threshold file range. The threshold file range may be a reasonable range of file sizes. The range may be determined based on previous cycles. The range may be determined based on regulatory, legal or industry standards. The threshold range may include a minimum file size. The threshold range may include a maximum file size. For example, a minimum threshold range for a file may be 1 Kilobyte ("KB"). In a further example, a maximum threshold range for a file may be 1 Gigabyte ("GB").

The data movement sub-control type may be a control configured to perform a check. The check may be a record check. The record check may be a duplicate record check. The check may determine if the file contains one or more duplicate records. For example, the check may determine if the file contains duplicate copies of a social security number. If a duplicate copy is found, the control may take one or more actions. For example, if the control is a preventative control, the control may prevent a file with duplicate records from continuing with the data flow.

In a further example, the control may be a detective control configured to determine the presence of duplicate records. The detective control may record the results of the duplicate records in a database. The detective control may not lock the system from continuing with data traffic flow. The detective control may transmit a report of duplicate file records to a database. The detective control may submit a request that the file be corrected at a later time. The detective control may request that the file be corrected by an authorized database and/or individual in real-time. In yet a further example, the control may be a corrective control. The corrective control may be configured to determine the presence of duplicate records. The corrective control may delete the duplicate record.

The data movement sub-control type may be a control configured to perform a time check. The time check may determine a time period. The time period may be the relevant time period associated with the data in the data movement. The time period may be any suitable time period. For example, the time period may be an hourly period, daily period, weekly period, monthly period or yearly period.

The time period may be verified as the correct time period. The data may be checked to determine that the file data complies with the required time period. The file data may be checked to determine if the file data contains the data for the correct time period. The file data may be checked to determine if any file data from additional time periods is present. For example, the time period may be set as daily. The file may be checked to determine that only data from the specified day is present within the file. In a further example, data from the wrong time period may be present within the file. A preventative control may lock the system. A preventative control may prevent the file from continuing in the data flow process. A corrective control may remove the data from the wrong time period.

The data movement sub-control type may be a control configured to determine the completion of one or more jobs. The job may be a dependent job. The control may check to ensure that all required dependent jobs have been completed. The control may check to ensure that all required processes have been completed. The control may determine if any jobs or processes are awaiting completion. The control may perform the check prior to beginning data movement. The control may transmit a request to complete a job.

The data movement sub-control type may be a control configured to implement a monitoring process. The monitoring process may monitor performance. The performance may be the performance of one or more vendor, partner or any other suitable candidate for interaction with a financial institution. The performance may be checked against a service level agreement ("SLA"). The control may report the monitored performance of the SLA. The report may note the difference between the requested services in the SLA and the actual services performed.

The data movement sub-control type may be a control configured to test a plan. The plan may be a communication plan. The communication plan may be used to communicate one or more changes. The changes may be business changes. For example, the plan may be used to determine if any business changes have been made in a financial institution. The changes may be technology changes. The control may determine whether business changes have been made. The control may determine whether technology changes have been made. The control may ensure that all changes have been documented. The control may ensure that all changes have been communicated to one or more related parties. For example, a business change may be made by one business unit. The change made by the one business unit may affect three, or some other suitable number of, business units. The control may ensure that the change is communicated to all three business units. In another example, the control may prevent the data traffic from continuing unless the change is communicated to all three business units.

The data movement sub-control type may be a control configured to perform a test. The test may be a well formed test. A well formed test may be used to determine that a complete file is transmitted. The test may determine if the file is corrupted. The well formed test may determine if information is missing from the file. The well formed test may determine if data is missing from the file. The test may be performed by testing the file itself. The file may be tested by obtaining one or more samples. The samples may be random samples. The samples may be obtained from the transmitted file. For example, the header information of the file may be tested. In a further example, the trailer information of the file may be tested. The test may compare the header and/or trailer information to the original document. The original document may be the document prior to transmission of the file. The original document may be retrieved from a database.

The data movement sub-control type may be a control configured to test a checksum of the file. The checksum may be chosen from a point within a file. The point may be a random point within the file. The control may test one or more checksums from a file. The checksum may be tested to ensure that the file has not been corrupted. The checksum may be tested to ensure that no data is missing from the file. The checksum may be tested to determine if the file has been modified.

The control may instruct the system to correct the file. The control may correct the corruption of the file. The control may determine the substance of the modification to the file. For example, the control may operate under a predetermined set of rules. The rules may be any suitable set of rules. For example, a rule may allow data flow to continue despite the presence of an error or modification. In a further example, the rule may indicate that an error or modification in a second location of the file may lock the data flow from continuing.

The data movement sub-type control may be a control configured to perform a check. The check may be a null/blank check. The null/blank check may determine if one or more data fields have been populated. The null/blank check may determine if one or more data fields have not been populated. The null/blank check may determine if one or more data fields have been populated with an erroneous value or character. For example, a data field may require a numeric value. In a further example, the data field may be populated with a non-numeric character.

The data movement sub-type control may be a control configured to perform a test. The test may determine if information is missing. The information may be missing from a data feed. The test may be a missing information feed detection test. The test may determine the number of files intended for transmission. The test may determine if the correct number of files has been received. The test may determine if any information is missing. The test may determine if a file was successfully transmitted. The test may determine if a file was successfully received. The test may ensure that each file has been received in the proper order.

The data movement sub-type control may be a control configured to determine output. The output may be one or more records. The control may determine if one or more records have been output in the correct order. For example, an application may transmit KBE data. The KBE data may be transmitted to a downstream system. The KBE data may be transmitted within a file feed. The control may check to ensure that the KBE has been received in the correct order.

The front end control may be associated with one or more control sub-types. Exemplary control sub-types may include pick list, required field, business rule or other. The operational control may be associated with one or control sub-types. Exemplary control sub-types may include verify/validate, sample or other. The data quality reporting control may be associated with one or more control sub-types. Exemplary control sub-types may include reporting, integrity/consistency or other. The control sub-type may be selected from a dropdown list. The control may be further associated with a control category. The control category may be a preventative, detective or corrective control.

A data flow may include a plurality of KBEs. The data flow may include a plurality of controls. One or more controls may apply to one or more KBEs within the data flow. One or more controls may apply to a subset of the KBEs within the data flow. One or more controls may not apply to a subset of KBEs within the data flow. For example, a data flow may include five KBEs, or any other suitable number. In a further example, one junction of the data flow may include a control. The control may be a preventative data movement control. The control may be associated with two of the five KBEs. The associated KBEs may be indicated on a lineage map. The non-associated KBEs may be indicated on a lineage map.

The process may identify one or more issues. The issue may be a problem, error or discrepancy. The issues may be control issues. The control issues may be any suitable issue related to a control. The issue may be a problem with a control. The problem may be a control malfunction. The issue may be the presence of the wrong type of control. For example, a preventative control may be the proper control for a data movement. In a further example, a corrective control may be incorrectly placed instead of the preventative control.

The control may be an absence of a control. The control may be needed. The needed control may not be present. For example, the data lineage may be configured to comply with compliance standards. The compliance standards may be industry standards, internal financial institution standards, government standards, government laws or regulations, or any other suitable standards. The standards may require the presence of a control. The control presence may be required at a certain point in the data lineage. For example, the standards may require the presence of a control when the data moves from a first system to a second system. In a further example, the standards may require a control prior to data being retrieved from a SOR.

The standards may require the presence of a plurality of controls. For example, a control may be required for the lineage of the data movement from a first system to a second system. In a further example, the standards may require an additional control for the lineage of the data movement from the second system to a third system. The standards may require a plurality of controls for one location. For example, a preventative control and a corrective control may be required for one data movement.

The system may address one or more control issues. Exemplary control issues may include conflicting controls, insufficient controls, malfunctioning controls or improper controls. For example, the system may attempt to fix or address one or more of the control issues. In a further example, the system may attempt to diagnose a control issue. In yet another example, the system may determine whether the diagnosed control issue requires immediate correction. The system may assign a score or value to the control issue.

The value may be assigned based on the severity of the control issue. The value may be assigned based upon one or more standards. For example, a first value may be assigned to a data flow where there is no control present. The value may require approval of a DSE for the data flow to continue. The value may be configured to automatically shut down the data flow until the control issue is remediated. In a further example, a second value may be assigned to a data flow. The second value may be assigned for a secondary control. A secondary control may be a backup control. For example, two controls may be required for a portion of the data traffic. The controls may be a corrective control and a preventative control. The second value may be assigned where only one of the controls is present. The second value may be configured to allow the data traffic to continue. The second value may be configured to flag the control issue for later review.

The control issues may be prioritized. The prioritization of the control issues may enable remediation of the control issues. The remediation may be real-time remediation. The remediation may be remediation at a later time. The prioritization may determine whether the control issue requires a locking of the data flow. The prioritization may be a prioritization strategy. The strategy may be a strategy for creating one or more maps. The maps may be a plurality of KBE lineage maps.

The KBE data may include one or more data elements. The data elements may be input into a system. The system may be an SOO. The data elements may be transmitted between two or more systems. The movement of the data elements may be mapped. The data elements may be modified. The data elements may undergo a transformation. The modification and/or transformation of the data elements may be mapped.

The apparatus may include a plurality of SOOs. The KBE may be created at the SOO. The SOO may modify a KBE. Each of the one or more SOOs may be granted different permissions. For example, a first SOO may be granted permission to create KBEs. In a further example, a second SOO may be granted permission to modify KBEs. The second SOO may not be granted permission to create KBEs. In yet another example, an SOO may be granted permission to create a social security KBE.

The data elements input into the SOO may be collected to form a KBE. The KBE may originate at a POO. The POO may be a starting point. The starting point may be the starting point of the KBE. One or more data controls may be imposed on the KBE at the POO. The KBE may move through a series of data checkpoints. The checkpoints may be one or more controls. The final control for the KBE may be an application. The application may be a final application.

The apparatus may further include an SOR. The SOR may be an authoritative source of the KBE. The SOR may be a system responsible for maintaining the KBE data. The SOR may be responsible for maintaining the integrity of the KBE data. The SOR may be responsible for authenticating the KBE data. For example, KBE data retrieved from the SOR may be previously verified as authentic data.

The lineage data may be gathered. The gathered data may be used to create lineage documentation. The lineage documentation may be entered in a portal. The portal may be a metadata portal. The metadata portal may capture data lineage information. The metadata portal may capture control information.

Illustrative Data Flow

The data may begin at a first control point. The first control point may be located immediately prior to the inputting of the data into a SOO. The SOO may be any system with capability and/or permission to create or otherwise modify data. The data may be one or more data elements. The data elements may be input into corresponding data element fields. The collective data element fields may form a KBE. Immediately after the formation of the KBE, the system may include a control. The control may be a preventative control. The preventative control may lock the data traffic from continuing in the data flow. The preventative control may not lock the data traffic from continuing if required data is absent. The control may be a detective control. The detective control may determine the presence of one or more data elements.

The SOO may be the authoritative source of the KBE data. The SOO may be the POO. For example, the SOO may be the point at which data is entered into the system. The POO may be an independent point in the process. The POO may be located prior to the SOO. The location may be a physical location. The location may be a procession based location. For example, the data from the POO may be input into a first system. In a further example, at the SOO, the SOO may retrieve the information from the POO. The POO may be the source of the data. The POO data may be transferred to the SOO. The data may be retrieved from the SOO. The data in the SOO may be verified as the authoritative source of the data.

The SOO may not be the authoritative source of the data. For example, the POO may be the authoritative source of the data. In a further example, the SOR may be the authoritative source of the data. In some embodiments, the SOO and POO may be the same system. For example, the point at which the data is input into the system may be the point at which the KBE is formed from the data elements. The data may have a plurality of authoritative sources. For example, one or more databases or systems may be designated as an authoritative source for the data.

The data may be transferred. The transfer may occur in real time. The data may be transferred to a database. The database may be any suitable database. The database may be configured to store the data. The database may be a temporary database for the data. The database may be configured to determine the appropriate SOR for the data.

The data may be retrieved from the database. The data may be retrieved in real-time. During or after retrieval, the data may be transformed. For example, a data element may be altered during the retrieval. The data element alteration may be an intentional alteration. The data element alteration may be an unintentional alteration. The alteration may be a permanent alteration. The alteration may be a temporary alteration.

The database may transfer the data to an SOR. The apparatus may include one SOR. The apparatus may include a plurality of SORs. The apparatus may assign one SOR to a specific KBE. The apparatus may assign one SOR to an element of data. The assigned SOR may be the authoritative record for the KBE. The assigned SOR may be the authoritative record for the data element.

The SOR may be the platform responsible for maintaining the data. The SOR may include one or more security measures. The one or more security measures may protect the data. The one or more security measures may protect the integrity of the data. One or more controls may be utilized in conjunction with the SOR. For example, a corrective control may be used to rectify one or more errors in the KBE data. In a further example, a preventative control may prevent the SOR from storing unverified data.

The data flow may continue with a transfer from the SOR. For example, a query may be transmitted to the SOR. The query may request retrieval of a KBE from the SOR. The KBE may be transferred to a database. In another example, the SOR may transfer the KBE data to a database. The database may be a storage database. The transfer may be a batch transfer.

The database may be configured to store a KBE strategy. The KBE strategy may be a KBE prioritization strategy. The prioritization strategy may be input by an employee of a financial institution. The prioritization strategy may determine a KBE priority. The prioritization strategy may prioritize a first group of one or more KBEs over a second group of one or more KBEs. For example, the prioritization strategy may prioritize a social security number KBE over a location KBE.

The prioritization strategy may prioritize a first group of one or more data elements of a KBE over a second group of one or more data elements of the KBE. The prioritization strategy may prioritize a first group of one or more controls over a second group of one or more controls. For example, a preventative control may be in conflict with a corrective control. In a further example, the prioritization strategy may be configured to prioritize the preventative control over the corrective control.

The data lineage may be modified. The data lineage may be modified as a result of a prioritization strategy. The data lineage may be modified in response to a request. The data lineage may be modified as a result of routine maintenance. The data lineage may be updated in real-time. For example, a control may determine that a technology change has not been recorded in the data lineage. In a further example, the control may modify the data lineage. The modification may cure the absence of the technology change in the data lineage. The data lineage may be updated as a batch update. The batch update may be a regularly scheduled update. For example, the batch update may be scheduled to occur on a weekly basis. The batch update may be an as-needed update. For example, an update may be performed each time the data lineage is changed. The updated data lineage may be stored. The updated data lineage may be stored in a database. The database may be a relational database.

The data lineage may be validated. The validation may occur may be by sampling the data lineage. The sampling may retrieve a data lineage artifact. The data lineage artifact may be generated at random. The data lineage artifact may be sampled. The sampling of the data lineage artifact may validate the data lineage. The data lineage may be validated for completeness. The data lineage may be validated for accuracy.

Illustrative KBE Mapping Process

The data lineage may be included in a package. The package may be a documentation package. The data lineage documentation package may include a data element table. The data element table may detail KBE mapping. The KBE mapping may be detailed to specific data elements. The table may include one or more specific data elements.

The KBE map may include a KBE number. The KBE number may be associated with a specific KBE. The KBE number may be chosen from a KBE master list. The KBE may be associated with a KBE name. The KBE name may be chosen from a KBE master list.

The KBE map may include an application identifier tool ("AIT"). The AIT may be a local identifier. The KBE map may include an AIT name. The AIT name may be specific to an object. For example, the AIT name may be specific to a database. The AIT name may be specific to a data element. The AIT name may be specific to a transformation. The AIT name may be associated with an AIT number. The AIT number may be specific to an object, data element or transformation.

The KBE map may include an object name. The object name may be the name of table, view, service, record or report. The KBE map may include an object type. The object type may be selected from a dropdown list.

The KBE map may include a data type. For example, the data type may be a character. In a further example, the data type may be a number. In yet another example, the data type may be a date. The data type may be selected from a dropdown list. The KBE map may include the length of the KBE. The length may be the number of characters in a KBE.

The KBE map may include a designation. The designation may designate an application as a SOR. The designation may not designate an application as a SOR. An application may be designated as the SOR if the application is the authoritative source of the data element.

The SOR may be an information system. The information system may be a repository. The repository may be an authoritative repository. The repository may be accountable for active data management. The active data management may be the management of a specific set of data elements. The active data management may be the management of one or more relationships. The management may occur at one or more specified stages. The stages may be stages in a data element lifecycle. The management may include creating data, updating data or deleting operations.

The SOR may be granted administrative responsibility. The SOR may be granted operational responsibility. The administrative or operational responsibility may be shared. The sharing may be performed in conjunction with other systems. The administrative or operational responsibility may be granted only to the SOR. The SOR may be a starting point. The starting point may be the starting point for problem determination and/or troubleshooting. The SOR may be the system to receive input of data error corrections.

The KBE map may designate an application as an SOO. The designation may not designate the application as an SOO. The selection of the designation as an SOO may be chosen from a dropdown list. The SOO may be an information system. The information system may allow for data element modification. The information system may allow for data creation.

The KBE map may include a screen name. The screen name may be free form text. The screen name may be the name of the screen where the KBE is viewed. The screen name may be the name of the screen where the KBE is updated. The screen name may be associated with a screen field name.

The KBE map may describe the flow of information. The KBE map may describe how information is obtained. The obtaining of information may be designated as the POO. The KBE map may describe how the obtained information is input into the SOO. For example, the map may describe that a data element was input into the SOO via email. In a further example, the data element may be input into the SOO via an external flat file. The external flat file may be designated as the POO of the data element.

The KBE map may include the data transformation type. The data transformation type may include one or more data transformation details.

Each data lineage process may be assigned a DSE. The DSE may be responsible for maintaining the data lineage documentation. The DSE may grant permissions for certain data elements and/or controls. The DSE may impose restrictions for certain data elements and/or controls.

The DSE may initiate lineage map review sessions. The DSE may initiate a query. The query may determine if any changes have been made to the data lineage. The query may determine the time elapsed since the most recent data lineage update. Based on the query results, the DSE may determine if a review session should be initiated. If a review session is initiated, the DSE may transmit a lineage review and approval form. The form may require verification of data lineage accuracy. If changes to the data lineage are needed, the DSE may update the data lineage.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 is a block diagram that illustrates a computing device 101 (alternatively referred to herein as a "server") that may be used according to an illustrative embodiment of the invention. The computer server 101 may have a processor 103 for controlling overall operation of the server and its associated components, including RAM 105, ROM 107, input/output ("I/O") module 109, and memory 115.

I/O module 109 may include a microphone, keypad, touch screen and/or stylus through which a user of device 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database 111. Alternatively, some or all of server 101 computer executable instructions may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 113. When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for storing, transmitting and/or transporting relevant information.

Any information described above in connection with database 111, and any other suitable information, may be stored in memory 115. One or more of applications 119 may include one or more algorithms that may be used to develop data lineage, generate controls, prioritize controls and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
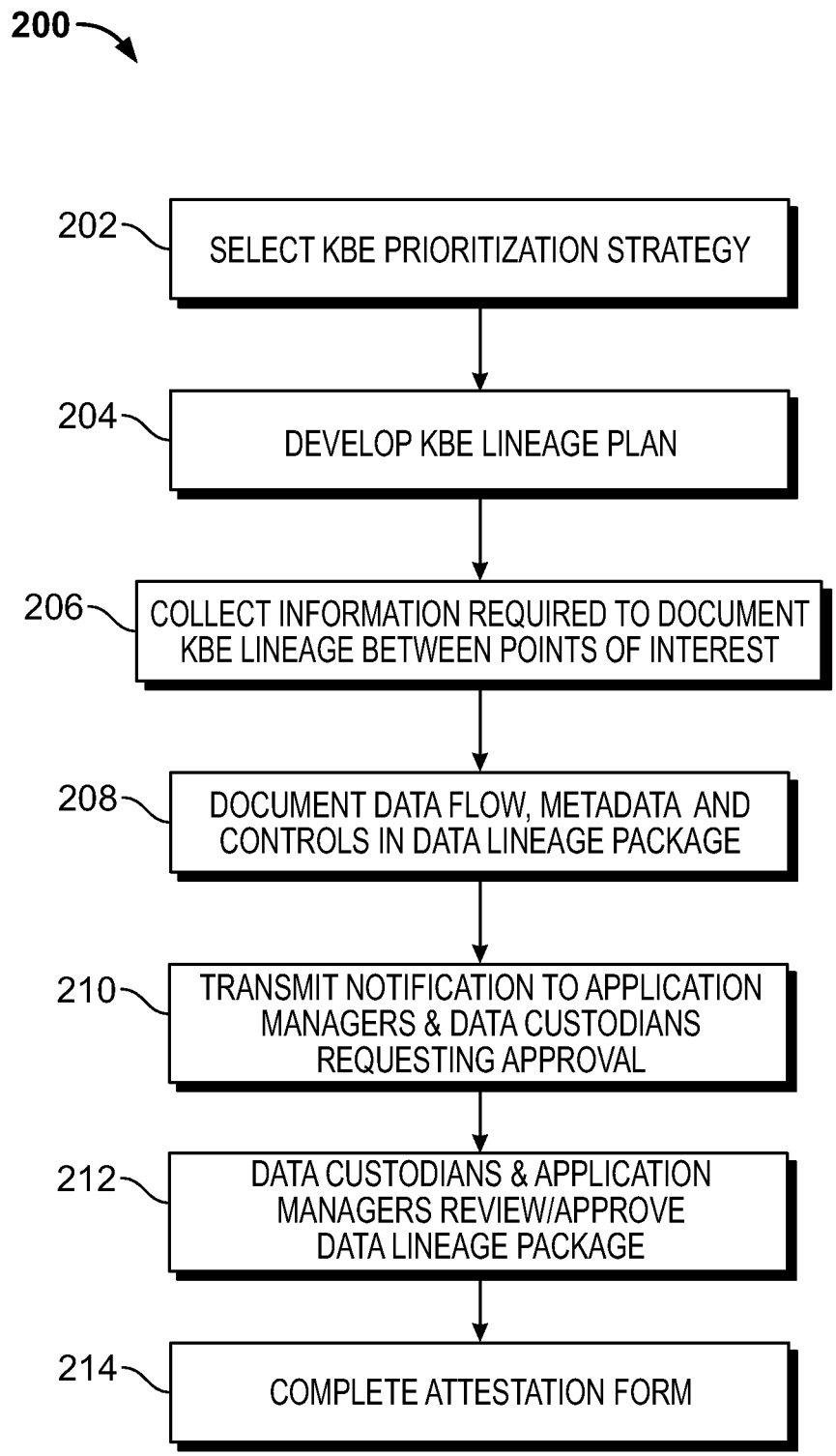
FIG. 2 shows an illustrative process in accordance with principles of the invention.

FIG. 2 shows illustrative process 200. For the sake of illustration, the steps of the process illustrated in FIG. 2 will be described as being performed by a "system." The "system" may include one or more of the features of the apparatus that are shown in FIG. 1 and/or any other suitable device or approach. The "system" may be provided by an entity. The entity may be an individual, an organization or any other suitable entity.

Process 200 may evaluate a business process. The business process may be evaluated for the integrity of the information. The business process may be evaluated form the accuracy of the information. For example, process 200 may evaluate the strength of a financial institution's data management. In a further example, process 200 may select a business element, such as Enterprise Capital Management.

Process 200 may include step 202. At step 202, the system may make a selection of one or more KBEs. The KBEs may be selected from a group of KBEs. The KBEs may be a group of KBEs that are related to a specific business process. For example, process 200 may assess the flow of information for an Enterprise Capital Management process. In a further example, the system may select three KBEs. In yet another example, the KBEs may be a risk rating, country rating and capital location.

At step 204, the system may develop a KBE lineage plan. The lineage plan may be developed for each KBE selected in step 202. For example, the system may develop a KBE lineage plan for risk rating. The lineage plan may include information related to each data element in a KBE. For example, the lineage plan may include the data flow for the KBE. The data flow may be associated with a data flow identifier. The lineage plan may include the source of the data. The data flow may include a data flow status.

The data lineage plan may include the movement of data. The data lineage may be a lineage map. For example, the data lineage map may begin at the data source. The data source may an application source. The application source may be any suitable application source. For example, the application source may be a client management portal. The data lineage may include the movement of data to one or more intermediate data points. The data points may be data transit points. The data point may be an application. For example, the lineage plan may move the data to a client database. The lineage plan may include information about the client database. For example, the lineage plan may display the data element, data element name, object name, SOR and approved provisioning point.

The data lineage plan may be mapped. The user may map the source data element. The user may map the target data element. The data flow of the lineage may be internal to an application. The data flow may be moved from a first application to a second application.

The data lineage plan may include a list of the applications. The list of applications may be applications through which a KBE data element moves. The data lineage plan may include any transformation of the data element as a result of the data element moving through the application.

The lineage data may create lineage documentation. The lineage documentation may be entered into the Metadata Portal.

The data lineage may capture data flow. The data lineage may capture control information. The information may include the existence of controls. The information may include the non-existence of controls. The information may include the location of the controls. The controls may be assessed for risks. The risks may be potential risks. The controls may be assessed for deficiencies. The deficiencies may be potential deficiencies. The data lineage may assess for control gaps. The data lineage may prioritize issues. The issues may be control issues. The control issues may be prioritized for remediation.

The lineage data may be established at an SOO. The lineage segments may be connected. The connection may provide an end-to-end view of data flow and controls.

The data lineage package may include data related to the KBE POO. The data lineage package may include data related to one or more systems connected to the KBE. A system connected to the KBE may be an SOO. Systems connected to the KBE may include the ability to create KBE data. Systems connected to the KBE may include the ability to modify the KBE data. The data lineage package may be further configured to include information related to the source of KBE. The source may be the authoritative source of the KBE. The source may be the SOR.

The data lineage package may include information related to KBE transformations that occur. The transformations may occur as the KBE moves through various applications.

The data lineage package may document a KBE prioritization strategy. The strategy may be a risk-based strategy. The strategy may include selecting one or more KBEs. The prioritization strategy may prioritize a pre-determined number of KBEs. The pre-determined number of KBEs may apply to a specified data flow. For example, the system may evaluate Enterprise Credit Risk. The system may prioritize three KBEs. For example, the system may select customer ID number, daily balance, and obligor identifier. In a further example, the system may evaluate the Global Control Function for commercial loans. The system may prioritize two KBEs. For example, the system may select the KBE's of social security number and loan amount.

The prioritization strategy may be configured to manage conflicting KBEs. For example, the system may include a library of KBEs. The library of KBEs may include one or more KBEs. Each KBE may include data lineage instructions and/or flow. The KBEs may include overlapping data flow instructions. The system may include instructions for prioritizing the flow of a first KBE over the flow of a second KBE. The system may assign an order of priority to indicate which KBE flow takes precedence. For example, multiple KBE's may be associated with a specific control. The system may apply a control to a first subset of the KBEs. The system may not apply the control to a second subset of the KBEs.

The lineage plan may trace the path of individual data elements. The lineage plan may document the path of individual data elements. The data elements may move from a first point to a second point. The lineage plan may document the movement of the data elements from a first point to a second point. The lineage plan may include documentation of controls along a data element path. The controls may ensure data quality and/or integrity. The lineage path may include one or more data transformations.

The lineage plan may include information. The information may include characteristics of a KBE. For example, the creation date and time of the KBE may be included in the data lineage. The data lineage plan may grant user access. For example, the data lineage plan may grant viewing access to a first user. In a further example, the data lineage plan may grant control access to a second user. Control access may include the ability to alter data. The lineage plan may identify potential data risks.

The system may receive input. The input may be a list. The list may be a list of data. The data may be one or more KBEs. A key business element may be an individual data element.

The system may select a KBE number. The KBE number may be selected from a Master KBE List. The system may select a KBE name. The KBE name may be selected from a Master KBE List. The system may select an AIT Name. The AIT Name may be specific to the object, data element or transformation. The system may select an AIT number. The AIT Number may be specific to the object, data element or transformation.

The system may select an Object Name. The Object Name may be the name of the table, view, service, record or report. The system may select a Data Element Name. The Data Element Name may be entered within the table, view, service, record or report of the Object Name. The system may select an Object Type. The object may be a table, view, service, record or report.

The system may select the SOR. The system may specify if the data element is the SOR. The system may specify whether the data element is the SOO.

At step 206, the system may collect information. The information may be required to document KBE lineage. The KBE lineage may be lineage between points of interest. For example, the system may collect information related to a first application. In a further example, the system may collect information related to a second application. In yet another example, the system may collect the information required to document the lineage between the first application and the second application.

At step 208, the system may document data in a data lineage package. The data may be data flow. The data may be metadata. The data may be the controls. The controls may be of one or more control types. For example, the controls may be Data Movement, Front End, Operational or Data Quality Reporting controls.

The controls may be automated control points. The automated control points may be preventative controls. The automated control points may be corrective controls. The automated control points may be detective controls. The controls may be manual control points. The manual control points may be selected from preventative, corrective and detective controls.

At step 210, the system may transmit a notification. The notification may be transmitted to one or more application managers. The notification may be transmitted to one or more DSEs. The notification may request approval. The approval requested may be approval of the KBE lineage plan.

At step 212, the DSEs and/or application managers may review the data lineage package. The DSEs and/or managers may approve the data lineage package.

At step 214, the DSEs and/or application managers may complete an attestation form.

Figure 3:
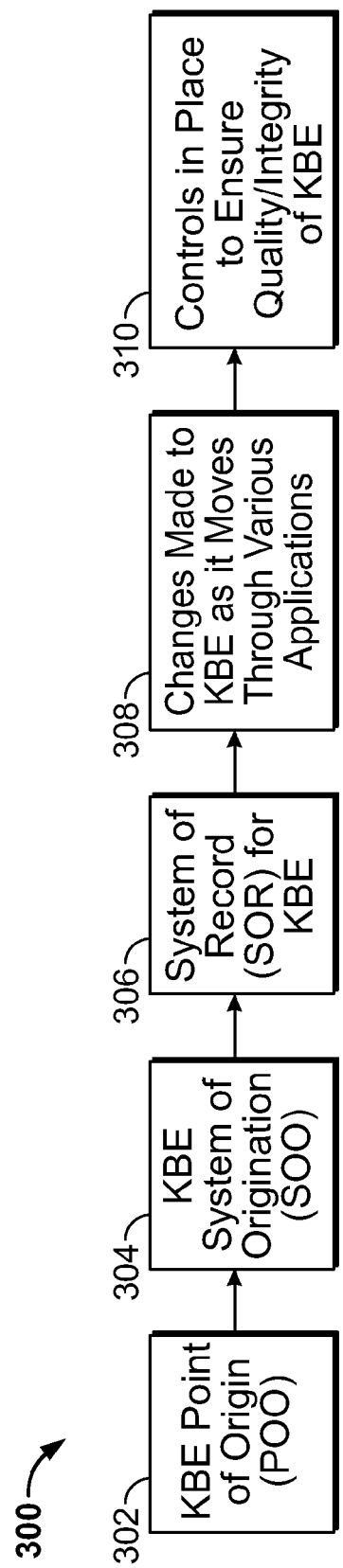
FIG. 3 shows an illustrative process in accordance with principles of the invention.

FIG. 3 shows illustrative process 300. Process 300 may include step 302. At step 302, the system may begin at the KBE POO. The system may use the data gathered from the POO to determine the source of the KBE data. The source of the KBE data may be the origination point of the KBE data.

At step 304, the system may document the KBE SOO. The system may use the data gathered from the SOO to determine the system permissions in place. For example, the system may determine if one or more systems have the capability or permission to create the KBE. The system may determine the identity of the one or more systems. In a further example, the system may determine if one or more systems have the capability or permission to modify the KBE. The system may determine the identity of the one or more systems.

At step 306, the system may document the KBE SOR. The system may use the data gathered from the SOR to determine the source of the KBE. The system may determine if the source of the KBE is the authoritative source.

At step 308, the system may identify one or more transformations made to the KBE. The transformation may be any suitable changes made to the KBE. The system may document the changes. The changes may be made to the KBE by different applications. The system may associate a unique signature identifier with each change made by a different application.

At step 310, the system may determine the presence of one or more controls. The system may determine the absence of one or more controls. The controls may be KBE quality controls. The controls may be KBE integrity controls.

Figure 4:
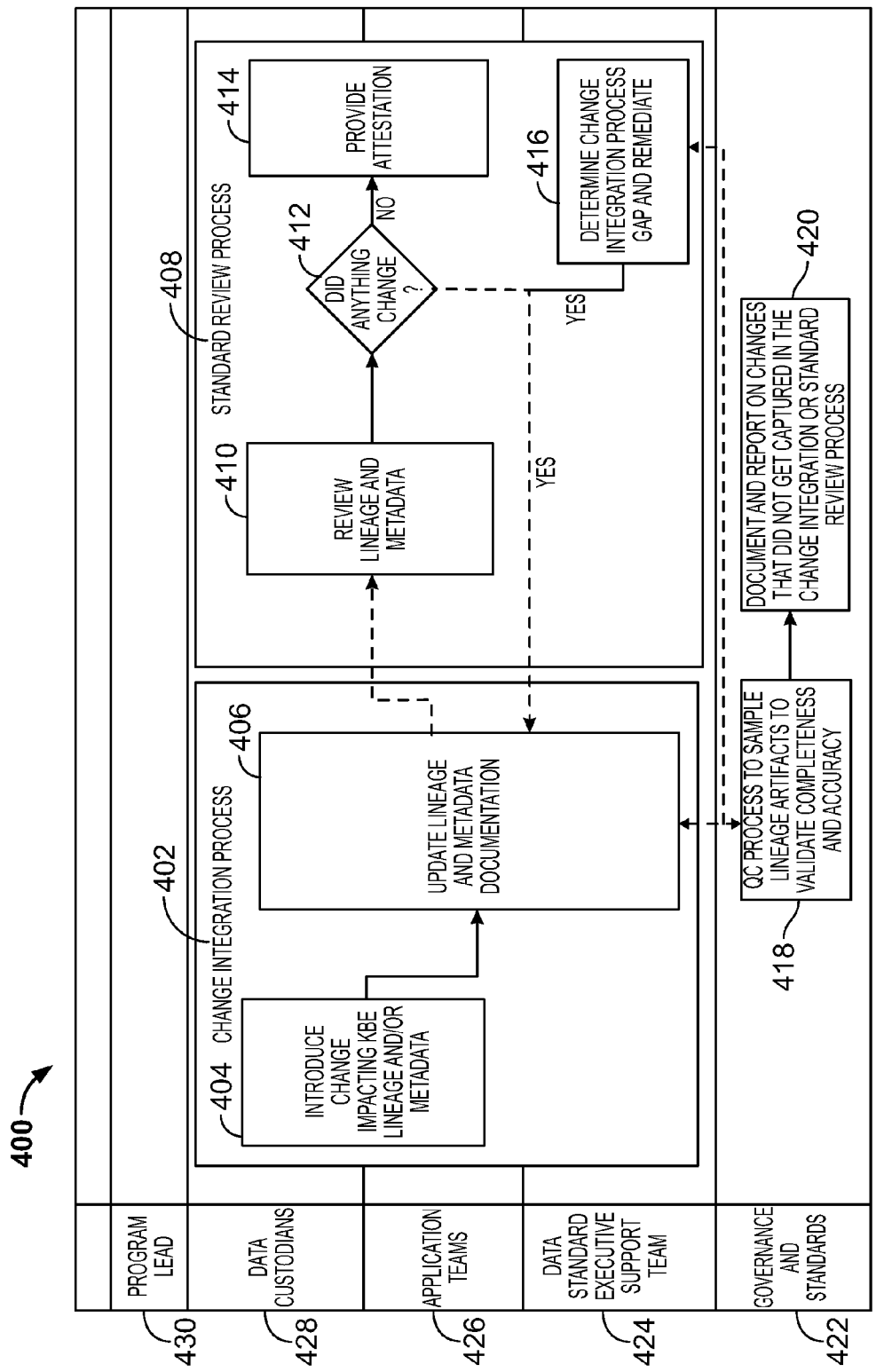
FIG. 4 shows an illustrative process in accordance with principles of the invention.

FIG. 4 shows illustrative process 400. Process 400 may be a KBE Lineage Documentation Maintenance Process.

Process 400 may begin at step 402. At step 402, the system may begin a data change integration process. Step 402 may include step 404.

At step 404, the system may introduce a change. The change may impact KBE lineage. The change may impact KBE metadata. The change may be introduced by one or more of data custodians 428 or application teams 426.

Step 402 may include step 406. At step 406, the system may update KBE lineage documentation. The system may further update KBE metadata documentation. The update may be introduced by one or more of data custodians 428, applications teams 426 or data standard executive support team 424.

Process 400 may continue at step 408. At step 408, the system may begin a standard review process. Step 408 may include step 410.

At step 410, the system may review KBE lineage and metadata. The review may be a review of the KBE lineage and metadata documentation may be updated at step 406. Step 410 may be performed by one or more of data custodians 428 or application teams 426.

At step 412, the system may make a determination. The system may attempt to determine if any of the KBE lineage and/or metadata has changed. The determination in step 412 may be determined by one or more of the data custodians and/or application teams. If no data or lineage has been changed, the system may proceed to step 414. At step 414, the system may provide attestation. The attestation may state that no changes have occurred. Step 414 may be performed by one or more of the data custodians and/or application teams.

If KBE lineage and metadata have been changed, the system may proceed to step 416. At step 416, the system may determine a gap. The gap may be a change integration process gap. The system may remediate the gap. Step 416 may be performed by the Data Steward Executive Support Team.

At step 418, the system may initiate a quality control process. The quality control process may sample lineage artifacts. The sampling may be performed to validate completeness. The sampling may be performed to validate accuracy. Step 418 may be performed by the Governance and Standards Team.

At step 420, the system may document and report changes. The changes may be changes that were not captured in step 416. Step 420 may be performed by the Governance and Standards Team.

Figure 5:
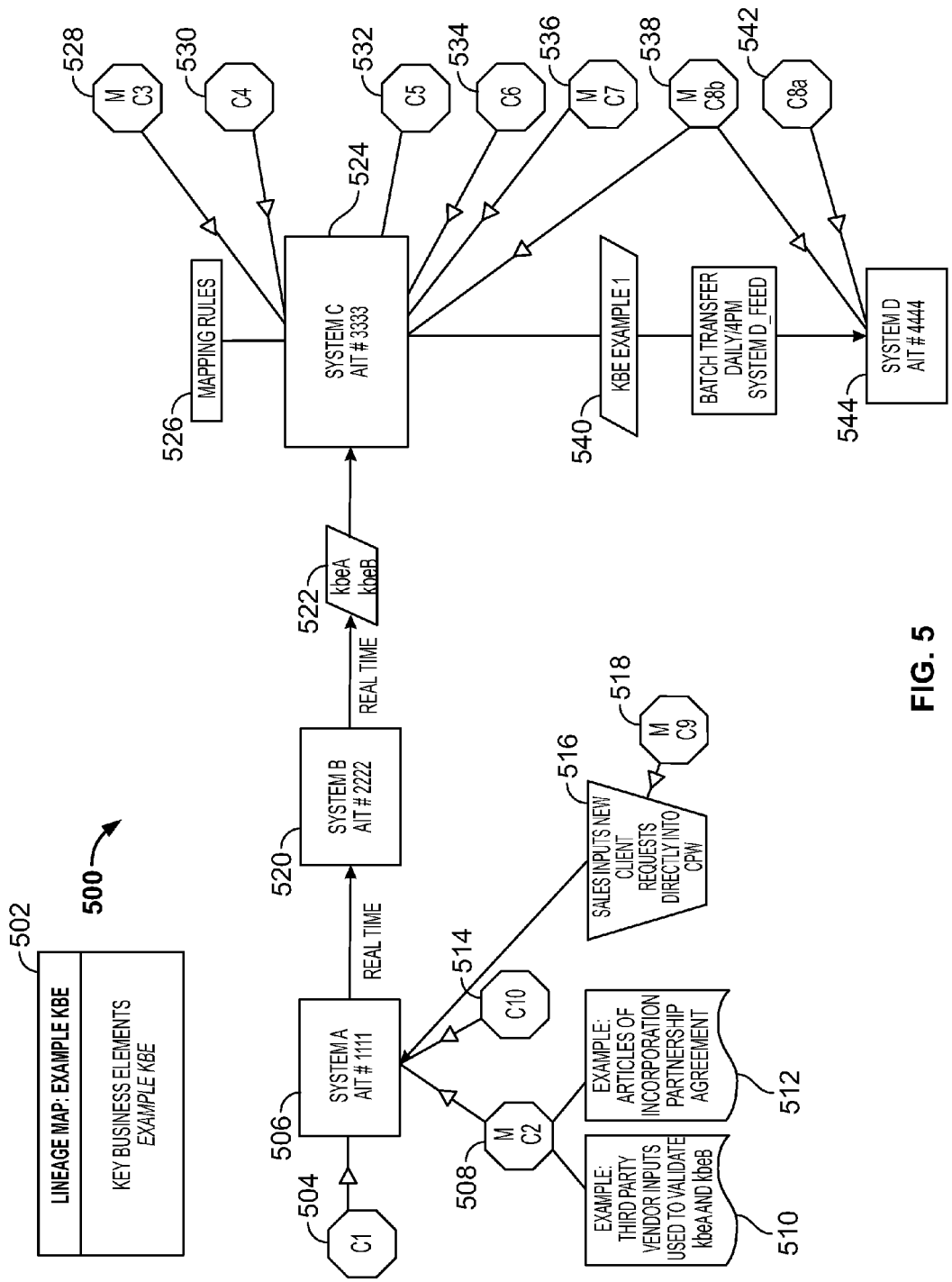
FIG. 5 shows an illustrative process in accordance with principles of the invention.

FIG. 5 shows illustrative process 500. Process 500 may include Example KBE 502. Example 502 may contain the lineage map name. Example KBE 502 may be any suitable KBE.

Process 500 may begin at step 504. Step 504 may be a control. The control may be an automated control point. The control may be a preventative control. The preventative control may prevent the continuation of an unauthorized data process.

Process 500 may continue at step 506. At step 506, the process may include a system. The system may be an SOO. The SOO may create lineage data. The SOO may maintain the data. The SOO may change or otherwise edit the data.

The SOO may be associated with control 508. Control 508 may be an automated control point. Control 508 may be a preventative control.

For example, control 508 may use third party vendor inputs in step 510. The third party vendor inputs may be used to validate the KBE. For example, control 508 may determine, using third party vendor inputs, that the KBE is valid. In another example, upon the determination of a valid KBE, the control may allow the system to proceed to the next step. In a further example, control 508 may determine, using third party vendor inputs, that the KBE data cannot be validated. In yet another example, the control may prevent the system from proceeding to the next step.

At step 512, control 508 may be used to determine the presence of an Articles of Incorporation of Partnership Agreement. For example, control 508 may determine that no Articles of Incorporation or Partnership Agreement is present. In a further example, control 508 may prevent the system from proceeding to the next step.

The SOO may be associated with control 514. Control 514 may be a detective control. For example, control 514 may determine that the data of the data is correct to ensure that the KBE file contains the data for the correct time period.

At step 520, the process may include a system. The system may be a database. The database may transfer the data. The database may persist the data.

At step 522, a derivation or transformation of the data may occur. For example, a transformation of the KBE may occur. In a further example, the database may transfer KBE data in real-time.

At step 524, the SOR may receive the data in real time. The SOR may be a platform. The platform may maintain the data. The SOR may be associated with mapping rules 526.

The SOR may be associated with one or more controls. For example, control 528 may be a corrective control. Control 528 may be associated with the SOR of step 524. In a further example, control 530 may be a preventative control. Control 530 may be associated with the SOR of step 524.

At step 540, the data may be part of a batch transfer of data. The batch transfer may be a daily batch transfer. At step 544, the batch transfer may transmit the data to a database. The database may persist or otherwise store the data.

Figure 6:
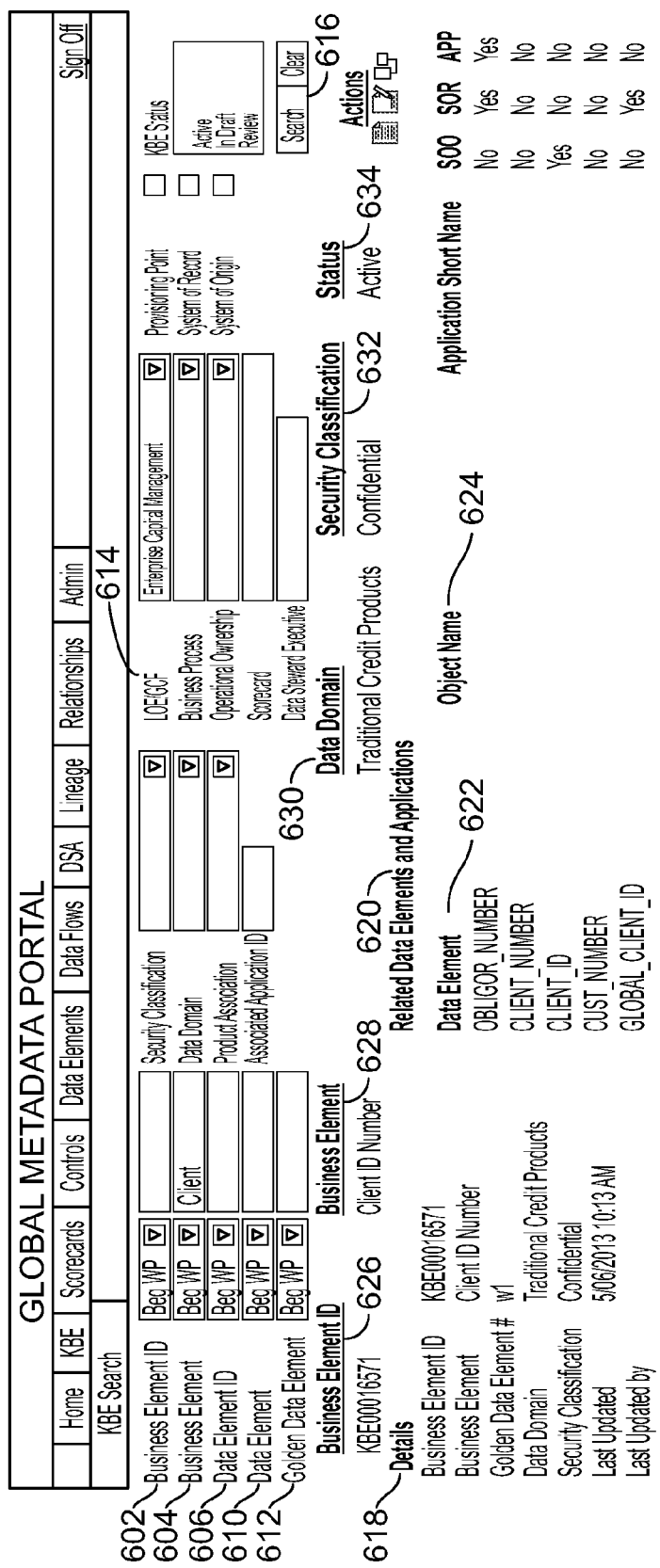
FIG. 6 shows an illustrative arrangement in accordance with principles of the invention.

FIG. 6 shows illustrative display 600. Display 600 may be a GUI. Display 600 may be a display of a global metadata portal. The global metadata portal may be used to conduct a KBE search.

Display 600 may include business element ID 602. Business element ID 602 may allow a user to select an element ID number for the KBE. The ID may be any suitable alphanumeric identifier. The ID may be used to associate a KBE with a specific business element. For example, the element ID number 4567 may correspond to any suitable business element.

Display 600 may further include business element 604. Business element 604 may correspond to any suitable business element. For example, business element 604 may correspond to client ID number.

Display 600 may include Data element ID 606. Data element ID 606, data element 608 and golden data element 612.

Figure 7A:
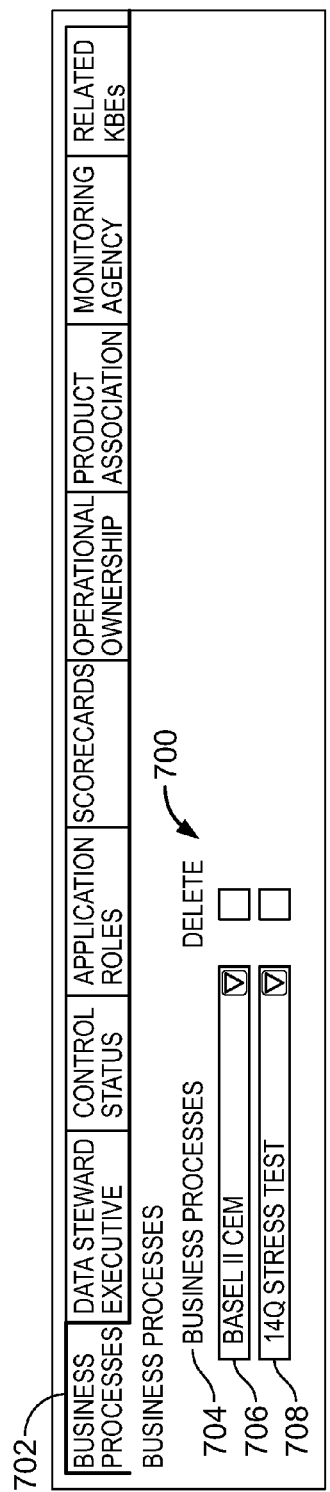
FIG. 7a shows an illustrative arrangement in accordance with principles of the invention.

FIG. 7a shows illustrative display 700. Tab 702 may allow for a selection of a business process. The business process may correspond to one or more KBEs. The selection of a business process may allow for the determination of KBE priority. The selection of a business process may be used to determine data flow.

Drop down-menus 706 and 708 show illustrative business processes. For example, drop-down menu 706 shows a selection of the Basel II CEM business process. Upon the selection of the business process, the system may determine the applicable KBEs. In a further example, the system may apply the KBEs to determine data flow. In yet another example, the system may determine the existence of controls at various points along the data flow.

Figure 7B:
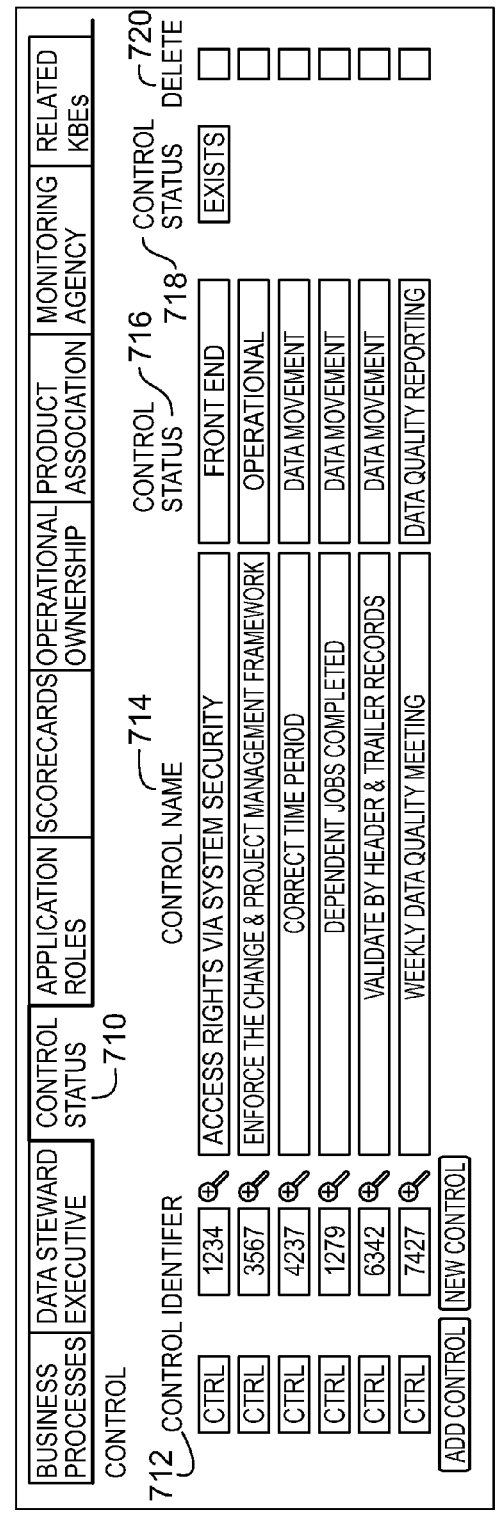
FIG. 7b shows an illustrative arrangement in accordance with principles of the invention.

FIG. 7B shows an exemplary display. The display may be accessed using tab 710. Tab 710 may be a control status tab. The control status tab may grant access to customize various controls. The controls may be controls associated with data flow.

Tab 710 may include control identifier 712. Control identifier 712 may display individual controls. Each control may be associated with a unique control identifier. The control identifier may be any suitable alphanumeric code. Control identifier 712 may be associated with control name 714. Control name 714 may be used to identify the name of the control. For example, control name 714 may identify a control as a preventative control. In a further example, control name 714 may identify the name of the control as "Correct Time Period."

Tab 710 may display control type 716. Control type 716 may identify the operational location of a control. The location of the control may be associated with one or more of control identifier 712 and control name 714. For example, control type 716 may state that a control is front end, operational, data movement, data quality reporting. In a further example, control type 716 may indicate that the control is preventative, corrective or detective.

Tab 710 may further display control status 718. Control status 718 may indicate whether the control exists. Control status 718 may be associated with one or more of control identifier 712, control name 714 and control type 716.

Tab 710 may column 720. Column 720 may allow a user to instruct the system to delete one or more controls.

FIG. 8 shows illustrative display 800. Display 800 is an illustrative display of Graphical User Interface for creating and/or editing a KBE. Display 800 may be created or edited by a user. The user may fill in the information in one or more of the data field. The DSE may review the KBE information. The DSE may review the KBE information on a set schedule. For example, the DSE may review the KBE information weekly, monthly or annually. The DSE may review the KBE information at will or as needed. The DSE may approve the KBE information.

Display 800 may include field 802. Field 802 may indicate if a new KBE is being created. Field 802 may indicate if an existing KBE is being edited.

Display 800 may include business element identifier 802 and business element name 804. Identifier 802 may be any suitable alphanumeric code corresponding to a business element. The business element may be associated with the KBE. Identifier 802 may be unique to the KBE. Name 804 may correspond to the name of the business element associated with the KBE. For example, the business element name may be Enterprise Risk Management. In a further example, the business element name may be client ID number. Name 804 may be selected from a drop-down menu.

Display 800 may further include status 806. Status 806 may display the status of the KBE. Status 806 may be selected from a drop-down menu. For example, the user may select to activate the KBE. In a further example, the user may select to de-activate the KBE. The user may specify that the KBE is a prioritized KBE.

Display 800 may further include security classification 808. Classification 808 may be chosen from a drop down list. Classification 808 may be characterized as classified, non-classified, restricted or any other suitable restriction.

Display 800 may include business definition 810. Definition 810 may define the KBE. For example, a KBE may be Enterprise Capital Management. Definition 810 for the KBE may be a characteristic of a business element. In a further example, definition 810 may be an element of the KBE. Definition 810 may define the KBE of enterprise capital management as a unique obligor identifier. Definition 810 may be associated with business rationale 812. Rationale 812 may state the reasoning for definition 810.

Display 800 may further include data domain 814, creation date 816, comments 818, field 820 and field 822. Domain 814 may specify the domain responsible for maintaining the KBE data. Date 816 may indicate the date of the KBE creation. Field 820 may indicate the date that the KBE was last modified. Field 820 may contain the same value as date 816. For example, if the KBE has not been modified since creation, field 820 may display the creation date. Comments 820 may be a fillable text box. Comments 820 may allow for one or more comments to be associated with the KBE. Field 822 may indicate the user who last modified the KBE.

Display 800 may further include DSE information 824. DSE information 824 may state the name of the DSE responsible for the KBE. Information 824 may state the LOB/Global Control Function of the KBE. Information 824 may state whether the DSE has accepted the KBE, whether the request for acceptance is still pending or whether the request for acceptance has been viewed by the DSE. Information 824 may state the date of the DSE acceptance date. Information 824 may state the next DSE review date.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, apparatus and methods for a data lineage management system have been provided. Persons skilled in the art will appreciate that the present invention can be practiced by other than the described embodiments, which are presented for purposes of illustration rather than of limitation. The present invention is limited only by the claims that follow.

What is claimed is:
1. An apparatus comprising:
a relational database configured to:
store a plurality of Key Business Elements ("KBEs") in the database, wherein each of the plurality of KBEs is selected from a group consisting of Account Balance, Social Security Number, Client H) Number, Location and Tier I Capital Balance;
in response to a query, retrieve a selected KBE, said selected KBE comprising one or more KBE parameters associated with the selected one or more KBEs;
a processor, said processor corresponding to said retrieval of said selected KBE, said processor configured to:
identify a KBE system of origination, said system of origination configured to create the KBE or modify the KBE;
identify a KBE system of record, said system of record configured to determine an authoritative source of the KBE; and
develop a data lineage of the KBE from the system of origination to the system of record;
wherein, in response to detection of a failure to record a technology change in the data lineage, the processor is further configured to implement corrective controls such that the processor locks a data flow associated with the KBE pending modification of the data lineage, modify the data lineage to include the technology change in the data lineage and, following the modification of the data lineage, unlock the data flow associated with the KBE.

2. The apparatus of claim 1 wherein the data lineage of the KBE is stored in the relational database.

3. The apparatus of claim 1 wherein the processor is further configured to implement a plurality of data integrity controls.

4. The apparatus of claim 3 wherein the data integrity controls are selected from a group consisting of preventative controls and detective controls.

5. The apparatus of claim 3 wherein the processor is further configured to authenticate the KBE data using the data integrity controls.

6. The apparatus of claim 1 wherein the system of origination is the authoritative source of the KBE data.

7. The apparatus of claim 1 wherein the system of origination is not the authoritative source of the KBE data.

8. The apparatus of claim 7 wherein a point of origination is the authoritative source of the KBE data.

9. The apparatus of claim 1 wherein the relational database is further configured, in response to a query, to retrieve a selected KBE prioritization strategy.

10. The apparatus of claim 1 wherein the modified data lineage is stored in the relational database.

11. The apparatus of claim 1 wherein the processor is further configured to sample data lineage artifacts to validate the data lineage.

12. One or more non-transitory computer readable media storing computer executable instructions which, when executed by a processor on a computer system, perform a method for creating a data lineage process, the method comprising:
storing a plurality of Key Business Elements ("KBE") in a relational database, wherein each of the plurality of KBEs is selected from a group consisting of Account Balance, Social Security Number, Client ID Number, Location and Tier I Capital Balance;
in response to a query, retrieving a selected KBE, said KBE comprising one or more KBE parameters associated with the selected KBE;
identifying, using a processor:
a KBE system of origination, said system of origination configured to create the KBE or modify the KBE;
a KBE system of record, said system of record configured to determine an authoritative source of the KBE;
developing a data lineage of the KBE from the system of origination to the system of record; and in response to detection of a failure to record a technology change in the data lineage, implementing corrective controls using the processor, such implementing comprising locking, using the processor, a data flow associated with the KBE pending modification of the data lineage, modifying, using the processor, the data lineage to include the technology change in the data lineage, and, following the modification, unlock the data flow associated with the KBE.

13. The media of claim 12 wherein, in the media, the data lineage of the KBE is stored in the relational database.

14. The media of claim 12 wherein, in the media, the processor is further configured to implement a plurality of data integrity controls.

15. The media of claim 14 wherein, in the media, the data integrity controls are selected from a group consisting of preventative controls and detective controls.

16. The media of claim 14 wherein, in the media, the processor is further configured to authenticate the KBE data using the data integrity controls.

17. The media of claim 12 wherein, in the media, the system of origination is the authoritative source of the KBE data.

18. The media of claim 12 wherein, in the media, the system of origination is not the authoritative source of the KBE data.

19. The media of claim 18 wherein, in the media, a point of origination is the authoritative source of the KBE data.

20. The media of claim 12 wherein, in the media, the relational database is further configured, in response to a query, to retrieve a selected KBE prioritization strategy.

21. The media of claim 12 wherein, in the media, the modified data lineage is stored in the relational database.

22. The media of claim 12 wherein, in the media, the processor is further configured to sample data lineage artifacts to validate the data lineage.

* * * * *